March 6, 1934.  G. W. McKEE  1,950,120
REGULATOR
Filed May 23, 1931
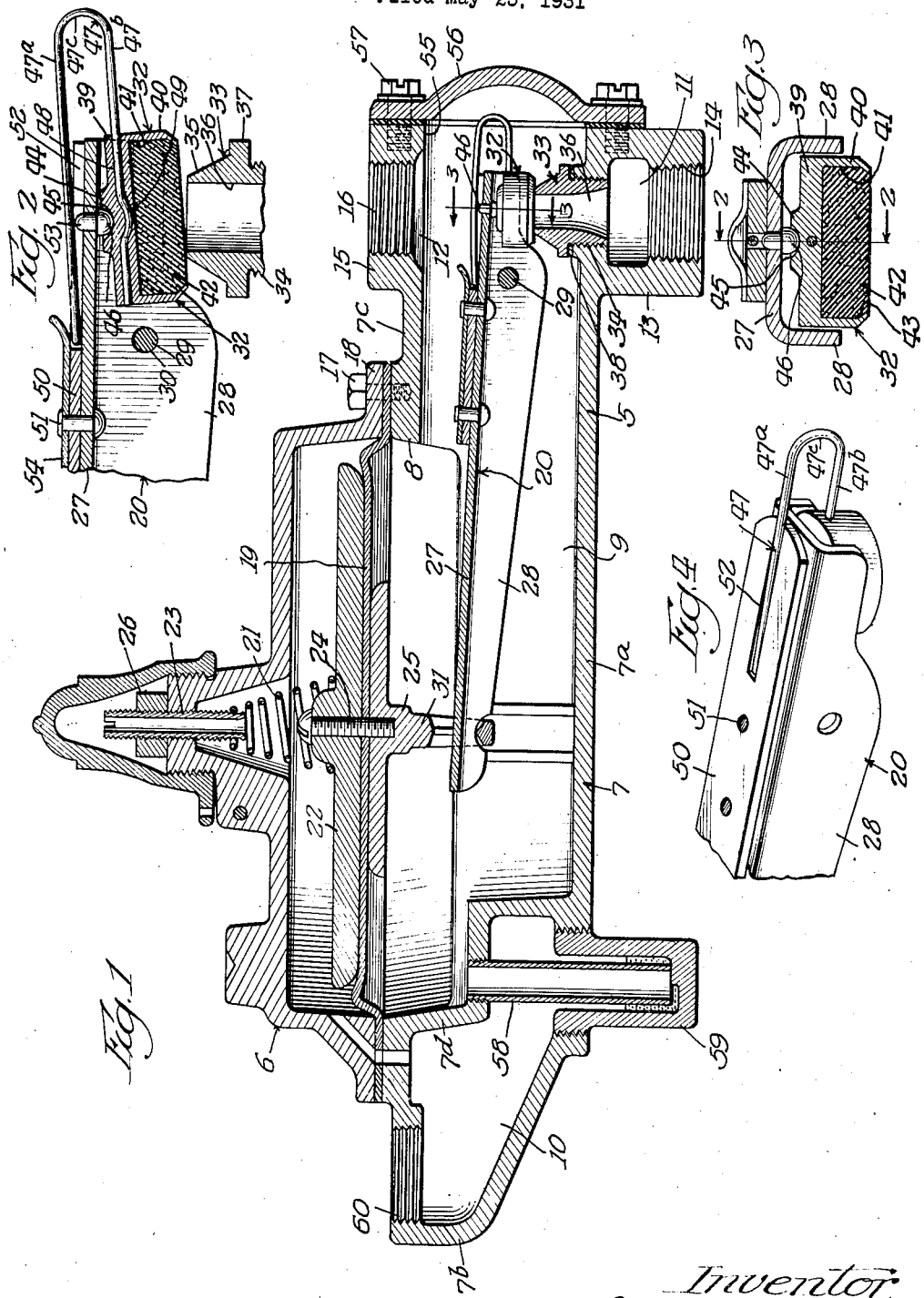

Patented Mar. 6, 1934

1,950,120

UNITED STATES PATENT OFFICE 1,950,120

REGULATOR

Garnet W. McKee, Rockford, Ill.

Application May 23, 1931, Serial No. 539,459

1 Claim. (Cl. 50—26)

The present invention relates generally to pressure regulators. More particularly the invention relates to that type of regulator which is adapted primarily for use in connection with gas supply systems, serves to maintain uniformity of pressure of the gas in the system and comprises (1) a two-part, cast metal casing which defines a gas chamber and is provided with an inlet for the gas, and an outlet; (2) a diaphragm which is clamped between the two parts of the casing and is responsive to fluctuations in the pressure of the gas in the chamber; (3) a horizontally extending lever which is centrally fulcrumed within the gas chamber and has one end thereof connected to the diaphragm; and (4) a valve-member which is supported from the other end of the lever for limited universal movement by means of a resilient clip and operates, in response to the action of the diaphragm, to control the flow of gas through the inlet into the casing so as to maintain the gas as it passes through the outlet at the pressure for which the regulator is set.

One object of the invention is to provide a pressure regulator of this type in which the clip for supporting the valve-member from the centrally fulcrumed lever consists of a piece of spring wire which is fixedly connected at one end thereof to the valve-member and has the other end looped or doubled back so as to fit slidably against the top face of the lever and hold the valve-member in supported relation with respect to the lever.

Another object of the invention is to provide a pressure regulator of the last mentioned character in which the centrally fulcrumed lever is provided at the top face thereof with a member which has an open-ended slot for receiving the looped end of the clip and cooperates with such end of the clip to prevent rotative movement of the valve-member.

A further object of the invention is to provide a pressure regulator of the aforesaid type in which the lever is formed of a metal stamping and embodies depending sides which are arranged so that they lap the side portions of the valve-member and tend to limit universal movement of the valve-member.

A still further object of the invention is to provide a pressure regulator of the type under consideration in which the inlet of the casing is provided with a valve seat and the valve-member for controlling the flow of gas through the inlet is supported by the spring wire clip in such a manner that, during closing of the inlet, the portion of the member that is nearest the fulcrum engages the valve seat before the other portions.

In addition, the invention contemplates as one of its objects providing a pressure regulator of the diaphragm lever type which is generally of new and improved construction, may be manufactured at a comparatively low cost and operates more efficiently than previously designed regulators of the same general type of design by virtue of the fact that the valve-member is so constructed and supported that it tends at all times to fit accurately against the valve seat.

Other objects of the invention and the various advantages and characteristics of the present regulator construction will be apparent from a consideration of the following detailed description.

The invention consists in the several novel features which are hereinafter set forth and are more particularly defined by claim at the conclusion hereof.

In the drawing which accompanies and forms a part of this specification or disclosure and in which like numerals of reference denote corresponding parts throughout the several views:

Fig. 1 is a vertical longitudinal section of a pressure regulator embodying the invention;

Fig. 2 is a sectional view, exhibiting in detail the manner in which the spring wire clip operates to hold the valve-member so that the portion thereof nearest the fulcrum for the diaphragm-operated lever, engages the valve seat before the other portions, during closing of the gas inlet of the casing;

Fig. 3 is a transverse section on the line 3—3 of Fig. 1 and illustrates the cross sectional construction of the lever and the valve-member; and Fig. 4 is a fragmentary perspective view of the end of the lever that supports or carries the valve-member.

The regulator which forms the subject matter of the invention is adapted primarily to be used in gas supply system. It comprises an elongated casing 5 and operates to maintain at a uniform pressure the gas that flows or passes through the system. The casing 5 is preferably formed of cast metal and consists of an upper part 6 and a lower part 7. The lower part of the casing consists of a bottom wall 7ª, a substantially continuous side wall 7ᵇ, a top wall 7ᶜ and a cross wall 7ᵈ. The top wall 7ᶜ is provided in the central portion thereof with a circular opening 8. The cross wall 7ᵈ is formed integrally with the bottom, side and top walls of the lower casing part 7 and defines a gas chamber 9 at one side thereof and a relief chamber 10 at its other side. The end of the lower casing part that has the gas chamber 9 is provided with an inlet 11 for gas and a gas outlet 12. The inlet 11 consists of a tubular part 13 which is formed integrally with and depends from the bottom wall 7ª and embodies an internal screw thread 14 for connection to a gas supply pipe (not shown). The outlet 12 is formed by a tubular part 15 which is formed integrally with and projects upwardly from the top wall 7ᶜ of the casing. The outlet-forming part 15 is located directly above the inlet-forming part 13 and embodies an internal screw thread 16 whereby it may be connected to a gas delivery pipe (not shown). The upper part 6 of the casing is located above the opening 8 in the top wall 7ᶜ and is connected removably to the lower part of the casing by means of bolts 17. The latter extend through an outwardly projecting flange 18 on the upper part of the casing and fit within internally threaded sockets in the portion of the top wall 7ᶜ that defines the circular opening 8.

In addition to the casing 5, the regulator comprises a circular diaphragm 19 and a substantially horizontal lever 20. The diaphragm extends across the circular opening 8 and has the marginal part thereof clamped between the flange 18 and the subjacent portion of the top wall 7ᶜ. The lower face of the diaphragm is exposed to the gas that passes into the chamber 9 through the inlet 11 and hence the diaphragm responds to variations in pressure of the gas in the chamber. The upper face of the diaphragm is subjected to the action of a spring 21. The latter extends between a cast metal plate 22 and a hollow adjusting screw 23. The plate 22 fits against the upper face of the diaphragm and is held in place by a screw 24. This screw extends through a hole in the center of the diaphragm and is anchored to a plate 25 which fits against the lower face of the diaphragm. The adjusting screw 23 extends through the central portion of the upper part 6 of the casing and is held in place by a lock-nut 26. By adjusting the position of the screw 23, the tension of the spring 21 may be varied for regulator setting purposes.

The lever 20 is disposed in the gas chamber 9 of the lower part of the casing and extends between the gas inlet 11 and the plate 25. It is formed of stamped metal and consists of a cross wall 27 and a pair of sides 28. The sides are formed integrally with and depend from the side margins of the cross wall 27 and are positioned in parallel relation. The lever 20 is centrally fulcrumed on a horizontally extending pin 29. This pin is carried by the side wall 7ᵇ of the lower casing part 7 and extends through aligned openings 30 in the sides 28 of the lever. The end of the lever that is disposed adjacent to the plate 25 is connected operatively to the diaphragm by means of a stirrup 31. The latter is connected to the central part of the plate 25 and serves to swing the lever vertically in response to movement of the diaphragm 19. The distal end of the lever 20, that is, the end that is remotely positioned with respect to the plate 25 and the stirrup 31, supports a valve-member 32. This member cooperates with a valve seat 33 and is adapted in response to swinging of the lever 20 by the diaphragm, to control the flow of gas into the gas chamber 9 through the outlet 16. When the pressure in the chamber 9 increases beyond a certain point, the diaphragm 20 is forced upwardly. This upward movement of the diaphragm is in turn imparted to the lever 20 and serves to shift the valve-member 32 into its closed position in order to cut off or curtail the inflow of gas into the chamber 9 and thus maintain uniformity of pressure as far as the gas passing through the outlet 16 is concerned. When the pressure in the gas chamber 9 decreases, the diaphragm 19 moves downwardly and causes the lever 20 to swing so as to shift the valve-member 32 into its open position. Opening of the valve-member results in a greater flow of gas into the chamber 9 and stabilization or uniformity of pressure. The valve seat 33 is located directly above the inlet 11 and is secured to the bottom wall 7ª of the lower part of the casing by a screw thread connection 34. It is provided with a tapered upper part 35 and embodies a central passage 36 through which the gas passes into the chamber 9 from the inlet 11. A polygonal flange 37 is formed on the central portion of the valve seat so that the seat may be turned by a wrench or similar tool into connected relation with the bottom wall 7ª of the casing part 7. To prevent leakage of gas around the valve seat, a gasket 38 is provided. This gasket is clamped between the polygonal flange 37 and the subjacent portion of the bottom wall of the lower casing part.

The valve-member 32 is cylindrical in conformation and consists of a circular top wall 39 and a side wall 40. The side wall 40 is formed integrally with the top wall 39 and forms with the latter a circular pocket 41 for a hard leather disk 42. The latter is adapted to fit against the tapered part 35 of the valve seat in order to close the passage 36 and cut off the flow of air to the chamber 9 from the inlet 11. The lower end of the side wall 40 is bent inwardly as at 43 so as to hold the hard leather disk 42 in the pocket 41. The central portion of the top wall 39 embodies an upwardly extending boss 44. This boss has a punch-formed, hemispherical recess 45 in which fits a rounded head on a rivet 46. The rivet 46 extends through the cross wall 27 of the lever 20, and, as illustrated in Figs. 1, 2 and 3 of the drawing, is disposed slightly inwardly of the outer edge of the cross wall. The rounded head on the rivet 46 forms a mount for the valve-member which permits of universal movement. The sides 28 of the lever 20 lap the side portions of the valve-member 32 and tend to limit universal movement of the valve-member. The valve-member is supported from the lever 20 by means of a clip 47. This clip is formed of spring wire and consists of an upper end part 47ª, a lower end part 47ᵇ and an intermediate connecting loop 47ᶜ. The lower end part 47ᵇ extends through a diametric opening 48 in the top wall 39 of the valve-member and is held by the intermediate connecting loop 47ᶜ so that it is parallel to the upper end part 47ª of the clip. In making the valve-member, the diametric hole 48 is drilled through the top wall 39. Upon completion of the drilling operation, the lower end part 47ᵇ of the spring wire clip is inserted into the hole 48. After insertion of the lower end part into the hole, the hemispherical recess 45 is formed by striking the boss 44 with a punch or die. In forming the recess 45, the metal in the central portion of the top wall, as shown in Fig. 2, is deflected downwardly and tends to form a bend 49 in the clip part 47ᵇ. This bend serves to effect a permanent and rigid connection between the valve-member 32 and the lower end part of the clip. The upper end part of the clip laps or rests upon the top face of the cross wall 27 of the lever 20 and supports the remainder of the clip in such a manner that the valve-member 32 is held in place against the rounded head of the rivet 46. Displacement of the upper end part of the clip is prevented by means of a plate 50. This plate is secured by rivets 51 to the top face of the cross wall 27 and is provided with an open ended, longitudinally extending slot 52. The upper end part of the clip fits snugly and slidably in the slot 52 and is held by the portions of the plate 50 that define the slot so that the valve member is held against rotation. In attaching the valve-member to the lever, the upper end part of the clip is inserted into the slot 52 and is slid inwardly until the valve-member is brought into place adjacent the rounded end of the rivet 46. The slot 50 is of such length that the upper end part of the clip is arrested when the valve-member is brought into place during the attaching operation. By virtue of the fact that the clip includes the intermediate connecting loop 47c, the lower end part 47b is yieldable relatively to the upper end part 47a and supports the valve-member 32 so that it is movable universally to a limited extent. The upper end of the rivet 46 projects above the top face of the cross wall 27 and forms a protuberance 53. The latter, as illustrated in Fig. 2, causes the clip 47 to hold the valve-member 32 in an angular position with respect to the lever and in such a manner that the portion nearest the fulcrum pin 29 engages the valve seat before the other portions during closing of the valve-member. By holding the valve-member in this manner, the portion of the valve-member farthest from the fulcrum pin is positively forced into engagement with the contiguous or subjacent portion of the valve seat during closing of the valve-member. This is attributable to the fact that the upward force resulting from contact of the portion of the valve-member nearest the fulcrum pin with the valve seat operates, through the medium of the universal joint (45, 46), to produce an equal downward force which serves to swing the portion of the valve farthest from the fulcrum pin downwardly into direct contact with the valve seat. The specific valve arrangement herein exhibited insures at all times, an efficient closing of the valve, and results in an impression of uniform depth in the leather disk 42 by the orifice part of the valve seat 33. It is decidedly an improvement upon an arrangement wherein the portion of the valve-member farthest from the fulcrum seat first engages the valve seat during closing of the valve, in that in the latter arrangement the forces are not applied in such a manner as to effect a complete or efficient closing of the valve. To prevent displacement of the free end of the upper end part of the clip, during swinging of the valve-member into its closed position, a strip 54 is provided. This strip is secured by the rivets 51 to the top face of the plate 50 and is arranged so that one end thereof projects over or laps the inner end of the slot 52. The end of the strip 54 that laps the inner end of the slot 52 is preferably bent upwardly so that it serves, during attachment of the valve-member to the lever, to direct the free end of the upper end part of the clip into the closed end of the slot 52.

An opening 55 is formed in the lower part 7 of the casing 5 so that the valve-member 32 is accessible for repair or replacement purposes while the regulator is in its operative or connected position. This opening 55 is closed by means of a cover plate 56 which is held removably in place by means of bolts 57.

To prevent the escape of gas in the event that excessive pressure is developed in the gas chamber 9 as the result of foreign particles preventing closing of the valve-member 32, a relief tube 58 is provided. This tube extends through the cross wall 7d of the lower casing part 7 and is arranged so that one end thereof projects downwardly into a cup 59 which is partially filled with mercury and communicates with the relief chamber 10. When excessive pressure accumulates or develops within the gas chamber 9, the gas displaces the mercury in the cup 59 and escapes via the relief chamber 10 to a vent opening 60.

Assuming that the valve-member 32 is in its open position, the operation of the regulator is as follows:

Gas enters the chamber 9 through the inlet 11 and the passageway 36 and then flows out of the casing through the outlet 12. When the pressure within the chamber 9 increases beyond a certain point, the diaphragm 19 is forced upwardly. This, as previously pointed out, swings the lever 20 so as to shift the valve-member 32 into its closed position. During closing of the valve-member 32, the portion of the valve-member nearest the fulcrum pin 29 is brought first into engagement with the subjacent portion of the valve seat 35 and tends, during further swinging of the lever 20, to exert a force which tends to shift the remaining portions of the valve-member into contact with the valve seat. When it is desired to repair the valve-member, the cover plate 56 is removed so that the valve-member may be withdrawn through the opening 55. In detaching the valve-member from the lever 20, the intermediate connecting loop 47c of the clip is pulled outwardly. This outward pull dislodges the recessed portion of the boss 44 from the rounded head of the rivet 46 and at the same time, slides the upper end part of the clip out of the slot 52 in the plate 50.

The herein disclosed regulator may be produced at a comparatively low cost and is exceedingly efficient in operation as a result of the construction and arrangement of the valve-member.

The invention is not to be understood as restricted to the details set forth, since these may be modified within the scope of the appended claim, without departing from the spirit and scope of the invention.

Having thus described the invention, what I claim as new and desire to secure by Letters Patent, is:

In a pressure regulator of the character described, the combination with a casing provided with a fluid inlet and outlet, and a diaphragm in the casing, of a substantially horizontal lever fulcrumed centrally within the casing and having one end thereof connected operatively to the diaphragm, a plate at the other end of the lever secured to the top face of the lever and embodying an open-ended longitudinally extending slot, a valve associated with and positioned under the said other end of the lever and adapted, in response to movement of the lever by the diaphragm, to control the flow of fluid into the casing through the inlet for pressure regulating purposes, a head and recess connection between the valve and the under face of the lever, operative to permit of limited universal movement of the valve, and a clip of spring wire for releasably supporting the valve from said other end of the lever, said clip having one end thereof connected fixedly to and projecting laterally from the valve and its other end doubled or looped back, fitting slidably and held against sidewise displacement in the slot in the plate and being formed so that the doubled or looped back intermediate portion thereof tends to urge the said one clip-end towards the other clip-end and hence causes the head and recess of the aforesaid connection to be held yieldingly in abutting relation.

GARNET W. McKEE.